(12) United States Patent
Sapienza et al.

(10) Patent No.: US 6,506,318 B1
(45) Date of Patent: *Jan. 14, 2003

(54) ENVIRONMENTALLY BENIGN ANTI-ICING OR DEICING FLUIDS

(75) Inventors: Richard Sapienza, Shoreham, NY (US); William F. Ricks, Westerville, OH (US); Axel R. Johnson, N. Babylon, NY (US)

(73) Assignee: MLI Associates, LLC, Westerville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/675,495

(22) Filed: Sep. 29, 2000

Related U.S. Application Data

(63) Continuation-in-part of application No. 09/436,811, filed on Nov. 9, 1999, now Pat. No. 6,129,857, which is a continuation of application No. 09/161,865, filed on Sep. 28, 1998, now Pat. No. 5,980,774, which is a continuation-in-part of application No. 08/940,936, filed on Sep. 30, 1997, now Pat. No. 5,876,621.

(51) Int. Cl.$^7$ ................................................. C09K 3/18
(52) U.S. Cl. ........................................... 252/70; 106/13
(58) Field of Search ............................... 252/70; 106/13

(56) References Cited

U.S. PATENT DOCUMENTS

| | | | |
|---|---|---|---|
| 2,716,068 A | * | 8/1955 | Fain et al. ............... 106/13 |
| 3,711,409 A | | 1/1973 | Avres et al. |
| 4,108,790 A | | 8/1978 | Foroulis |
| 4,223,129 A | | 9/1980 | Roth et al. |
| 4,279,768 A | | 7/1981 | Busch |
| 4,329,449 A | | 5/1982 | Roth et al. |
| 4,358,389 A | * | 11/1982 | Komig-Lumer et al. ...... 252/70 |
| 4,426,409 A | * | 1/1984 | Roe ........................ 427/221 |
| 4,448,702 A | | 5/1984 | Kaes |
| 4,501,775 A | * | 2/1985 | Parks et al. ............... 427/220 |
| 4,539,122 A | | 9/1985 | Son et al. |
| 4,647,392 A | | 3/1987 | Darden et al. |
| 4,664,832 A | | 5/1987 | Sandvig |
| 4,676,918 A | | 6/1987 | Toth |
| 4,746,449 A | | 5/1988 | Peel |
| 4,759,864 A | * | 7/1988 | Van Neste et al. ........... 252/75 |
| 4,869,841 A | | 9/1989 | Matteodo et al. |
| 4,954,279 A | | 9/1990 | Ma et al. |
| 4,960,531 A | | 10/1990 | Connor et al. |
| 5,071,582 A | | 12/1991 | Conville et al. |
| 5,135,674 A | | 8/1992 | Kuhajek et al. |
| 5,238,592 A | | 8/1993 | Stankowiak et al. |
| 5,244,600 A | | 9/1993 | Cuisia et al. |
| 5,268,116 A | | 12/1993 | Fusiak et al. |
| 5,324,442 A | | 6/1994 | Matthews |
| 5,330,683 A | | 7/1994 | Sufrin |
| 5,350,533 A | | 9/1994 | Hebred et al. |
| 5,376,293 A | | 12/1994 | Johnston |
| 5,387,358 A | | 2/1995 | Himmrich et al. |
| 5,387,359 A | | 2/1995 | Himmrich et al. |
| 5,395,658 A | | 3/1995 | Jaklin |
| 5,435,930 A | | 7/1995 | Chan et al. |
| 5,484,547 A | | 1/1996 | Mendoza |
| 5,635,101 A | | 6/1997 | Janke et al. |
| 5,639,319 A | | 6/1997 | Daly |
| 5,708,068 A | * | 1/1998 | Carder et al. ............... 524/375 |
| 5,709,812 A | | 1/1998 | Janke et al. |
| 5,709,813 A | | 1/1998 | Janke et al. |
| 5,718,834 A | | 2/1998 | Pollman et al. |
| 5,741,436 A | * | 4/1998 | Gershun et al. ............. 252/76 |
| 5,759,436 A | * | 6/1998 | Schrimpf et al. ............ 252/70 |
| 5,772,912 A | | 6/1998 | Lockyer et al. |
| 5,819,776 A | | 10/1998 | Kephart |
| 5,849,356 A | | 12/1998 | Gambino et al. |
| 5,853,610 A | * | 12/1998 | Kaes ........................... 252/70 |
| 5,876,621 A | | 3/1999 | Sapienza |
| 5,891,225 A | | 4/1999 | Mishra et al. |
| 5,904,321 A | * | 5/1999 | Cox et al. ............... 244/134 R |
| 5,922,240 A | | 7/1999 | Johnson et al. |
| 5,928,477 A | * | 7/1999 | Gammon et al. ............ 203/18 |
| 5,942,481 A | | 8/1999 | Talley et al. |
| 5,965,058 A | | 10/1999 | Janke et al. |
| 5,980,774 A | | 11/1999 | Sapienza |
| 5,993,684 A | * | 11/1999 | Back et al. .................. 252/70 |
| 6,060,122 A | | 5/2000 | Rossmaier |
| 6,080,330 A | | 6/2000 | Bloomer |
| 6,120,651 A | * | 9/2000 | Gammon et al. ............ 203/14 |
| 6,129,857 A | | 10/2000 | Sapienza |
| 6,149,834 A | | 11/2000 | Gall et al. |
| 6,156,226 A | * | 12/2000 | Klyosov et al. ............. 252/70 |
| 6,287,480 B1 | * | 9/2001 | Berglund et al. ............ 252/70 |
| 6,299,793 B1 | | 10/2001 | Hartley et al. |

FOREIGN PATENT DOCUMENTS

| | | | |
|---|---|---|---|
| DE | 3142059 | * | 5/1983 |
| FR | 2142191 | * | 1/1973 |
| GB | 2001095 A | * | 1/1979 |
| GB | 2050398 A | * | 1/1981 |
| JP | 02-202574 | | 8/1990 |
| WO | WO 01/07532 | | 2/2001 |
| WO | WO 01/51584 | | 7/2001 |
| WO | WO 01/64811 | | 9/2001 |

OTHER PUBLICATIONS

Sieghart et al., "Potassium Carbonate as an Alternative Deicer: Impact on Soil Properties and Vegetation" (no date).
http://www.VIGORO.CA/ICE/ingred.html (no date).

* cited by examiner

*Primary Examiner*—Anthony J. Green
(74) *Attorney, Agent, or Firm*—Hedman & Costigan, P.C.

(57) ABSTRACT

Deicing compositions comprised of hydroxyl-containing organic compounds and/or organic acid salts are disclosed.

82 Claims, No Drawings

ENVIRONMENTALLY BENIGN ANTI-ICING OR DEICING FLUIDS

CROSS REFERENCES TO RELATED APPLICATIONS

This application is a Continuation-in-part of application Ser. No. 09/436,811, filed Nov. 9, 1999, now U.S. Pat. No. 6,129,857, which is itself a continuation of application Ser. No. 09/161,865, filed Sep. 28, 1998, now U.S. Pat. No. 5,980,774, issued Nov. 9, 1999, which in turn is a continuation-in-part of Ser. No. 08/940,936, filed Sep. 30, 1997, now U.S. Pat. No. 5,876,621, issued Mar. 2, 1999.

FIELD OF THE INVENTION

The present invention relates to deicing fluid compositions and methods for deicing surfaces. More particularly the present invention relates to deicing fluid compositions comprising hydroxyl containing organic compounds and/or certain organic acid salts which are relatively environmentally benign.

BACKGROUND OF THE INVENTION

Freezing point lowering compositions are in widespread use for a variety of purposes, especially to reduce the freezing point of an aqueous system so that ice cannot be formed or to melt formed ice. Generally, freezing point lowering compositions depend for their effectiveness upon the molar freezing point lowering effect, the number of ionic species which are made available and the degree to which the compositions can be dispersed in the liquid phase in which the formation of ice is to be precluded and/or ice is to be melted.

The most pervasive of the commonly used products for deicing are common salt, calcium chloride and urea, with common salt (sodium chloride) being the least expensive and most commonly used. Common salt is widely used to melt ice on road surfaces and the like. In this manner the salt forms a solution with the available liquid in contact with the ice and thereby forms a solution with a lower freezing point than the ice itself so that the ice is melted. Chloride salts however suffer from relatively severe drawbacks, such as the harmful effects on surrounding vegetation by preventing water absorption in the root systems, the corrosive effects on animal skin such as the feet of animals, clothing, roadways and motor vehicles, and the deleterious effects on surface and ground water. Thus any new method of deicing or new deicing composition that can reduce the amount of chloride salts would solve a long felt need in the art.

For example, in roadway deicing applications, liquid calcium chloride (32%) is typically the preferred material when temperatures are too low for rock salt to be effective. However, the use of chloride salts is often not permitted or needs to be reduced in certain areas because of its highly corrosive nature, which causes destruction of surrounding vegetation, damage to roadways and vehicles, and contamination of water supplies.

Another drawback of certain prior art deicing fluids is their high chemical and biological oxygen demands, which make them environmentally unfavorable. The glycols are exemplary of deicing fluids that particularly suffer from this type of environmental drawback. Thus, any new method of deicing or new deicing composition that can reduce the amount of glycols would solve a long felt need in the art.

Due to the problems associated with deicing agents as described above there have been attempts to discover even more deicing agents. For, example, Kaes, U.S. Pat. No. 4,448,702 discloses the use of a freezing-point lowering composition and method which calls for the addition of a water soluble salt of at least one dicarboxylic acid having at least three carbon atoms, such as a sodium, potassium, ammonium or organoamine salt of adipic, glutaric, succinic or malonic acid.

Peel, U.S. Pat. No. 4,746,449 teaches the preparation of a deicing agent comprising 12–75% acetate salts, trace-36% carbonate salts, 1–24% formate salts and 1–32% pseudolactate salts which is prepared from a pulp mill black liquor by fractionating the black liquor into a low molecular weight fraction and concentrating the collected low molecular weight fraction to produce the deicing agent.

U.S. Pat. No. 4,960,531, teaches that small amounts of methyl glucosides, i.e., less than 10%, in combination with low amount, i.e., about 2.5%, of potassium carbonate can be employed as a trigger to conventional salt deicers. The '531 patent is an improvement patent on U.S. Reissue Pat. No. RE 32,477 which teaches the use of a salt mixture of sodium and potassium chloride and an amide. Other inorganic salts are also known to be useful as freezing point lowering agents such as magnesium chloride, potassium phosphates, sodium phosphates, ammonium phosphates, ammonium nitrates, alkaline earth nitrates, magnesium nitrate, ammonium sulfate, alkali sulfates.

Special mention is also made of Sapienza, U.S. Pat. No. 5,876,621 and Sapienza, U.S. Pat. No. 5,980,774 which disclose especially useful deicing and anti-icing compositions.

Solutions of low freezing point deicing and anti-icing agents typically include brines, ethylene glycol and propylene glycol solutions. The use of brines in anti-icing compounds can reduce, although not eliminate, the impacts of chlorides. Brines are used to transfer heat at temperatures below the normal freezing point of water. Ethylene glycol solutions are well known for use as coolants for automobiles and the like in regions in which the temperature may fall below the normal freezing point of water. Ethylene and propylene glycols are used in relatively large quantities at major airports in northern climates in order to keep air traffic flowing during inclement weather. The fluids are generally applied to the wings, fuselage and tail of aircraft as well as the runways to remove ice. However, these glycol compounds likewise have environmental drawbacks and can be detrimental to sewage treatment processes.

Other prior art deicing fluids such as alcohols have toxic effects and high volatility particularly in the low molecular weight range and may be the cause of offensive smell and fire danger. Furthermore, mono- and polyhydric alcohols oxidize in the presence of atmospheric oxygen to form acids, which can increase corrosion of materials.

Yet another reason why new deicing fluids are needed emerges from the recent changes to the freezing point requirements of the SAE AMS 1435A specification for airport runway deicing fluids. Newer AMS 1435A specifications require deicing fluids to have a freezing point of less than −14.5° C. for a 1:1 weight dilution. These specifications are such that many technologies, including existing glycol-based fluids currently used commercially, no longer meet the new requirements, including ASTM D 1177.

As such there exists in the art a need for new and improved deicing and/or anti-icing agents. Preferably these are free or substantially free of inorganic salts, are environmentally benign and are prepared from relatively inexpensive raw materials while still possessing desirable freezing point depression properties. Likewise, there also exists a need in the art for new deicing and/or anti-icing agents which can be used in combination with prior art deicing agents such as inorganic salts or glycols to substantially reduce the amount of inorganic salts or glycols, and thereby concomitantly reduce the environmental affects of the salts and/or glycols. Surprisingly, it has been found that compositions disclosed herein meet these needs.

The total active composition of the new deicing and/or anti-icing agents can vary from about 5 to about 100 weight percent. Improved solid deicers can be prepared which can be applied in the same manner as solid chloride salts with the environmental advantages described earlier.

SUMMARY OF THE INVENTION

Accordingly, in one preferred embodiment the present invention provides a deicing and/or anti-icing composition comprising (a) glycerols and (b) water.

In another preferred embodiment the present invention also provides a method for de-icing or anti-icing a surface comprising applying to the surface an effective amount of a de-icing agent and/or anti-icing agent comprising glycerols and water.

In a further preferred embodiment of the present invention there is provided a deicing and/or anti-icing composition comprising (a) glycerol, (b) an organic acid salt selected from the group consisting of a carboxylic acid salt, a hydroxycarboxylic acid salt, a dicarboxylic acid salt and mixtures of any of the foregoing and (c) water.

In still a further preferred embodiment of the present invention there is provided a method for de-icing or anti-icing a surface comprising applying to the surface an effective amount of a de-icing agent and/or anti-icing agent comprising (a) glycerols, (b) an organic acid salt selected from the group consisting of a carboxylic acid salt, a hydroxycarboxylic acid salt, a dicarboxylic acid salt and mixtures of any of the foregoing and (c) water.

In another further preferred embodiment of the present invention there is provided a deicing and/or anti-icing composition comprising (a) a hydroxyl-containing organic compound selected from the group consisting of hydrocarbyl aldosides including di- and polysaccharides such as sucrose, sorbitol and other hydrogenation products of sugars, monosaccharides, maltodextrins and sucrose, maltitol, glycols, monosaccharides, glycerol and mixtures of any of the foregoing, (b) a carbonate salt and (c) water.

In still another further preferred embodiment of the present invention there is provided a method for de-icing or anti-icing a surface comprising applying to the surface an effective amount of a de-icing agent and/or anti-icing agent comprising (a) a hydroxyl-containing organic compound selected from the group consisting of hydrocarbyl aldosides including di- and polysaccharides such as sucrose, sorbitol and other hydrogenation products of sugars, monosaccharides, maltodextrins and sucrose, maltitol, glycols, monosaccharides, glycerol and mixtures of any of the foregoing, (b) a carbonate salt and (c) water.

It is still further contemplated that useful deicing and/or anti-icing agents can be prepared from combinations of sorbitol and glycerol with water and with other materials such as carbonates and acetates, etc. These are especially useful for aircraft and airport runway deicing and/or anti-icing applications.

The present inventors have still further found that excellent deicing compositions can be obtained by upgrading recovered airport and/or aircraft runoffs. For example, the recovered runoffs, which typically contain at least about 5%, preferably at least about 10% by weight of glycol, or more, can be upgraded by adding effective amounts of (a) a hydroxyl-containing organic compound selected from the group consisting of hydrocarbyl aldosides; sorbitol and other hydrogenation products of sugars, monosaccharides, maltodextrins and sucrose; maltitol; glycols; monosaccharides; glycerols; and mixtures thereof, and/or (b) an organic acid salt selected from the group consisting of a carbonic acid salt, a carboxylic acid salt, a hydroxycarboxylic acid salt, a dicarboxylic acid salt and mixtures thereof These upgraded runoffs can then be used directly as de-icing and/or anti-icing agents for surfaces such as bridges, runways and highways.

Another benefit of the present invention is seen in that when carbohydrates are added to salts such as potassium acetate, the viscosity and wetting abilities of the anti-icing compound are increased. This has a dual effect of providing a compound which will not readily run off the surface, and of also providing a more persistent film which does not leave a dry powder after the surface later dries.

Further, in embodiments where some inorganic salt can be tolerated, such as on certain highway applications, the present invention further provides for upgrading recovered airport runoffs by addition of effective amounts of inorganic salts, such as sodium chloride, magnesium and/or calcium chloride and the like. Such compositions have improved environmental effects by reducing the amount of inorganic salts employed to obtain the same or better deicing and/or anti-icing properties.

The present invention still further provides a method for reducing the amount of inorganic salt necessary to achieve effective deicing and/or anti-icing, comprising adding to the inorganic salt, an effective amount of a deicing agent selected from the group consisting of glucosides, furanosides, maltosides, maltotriosides, glucopyranosides, sorbitols and other hydrogenation products of sugars, monosaccharides, maltodextrins and sucrose, glycerols and mixtures of any of the foregoing.

The compositions and methods of the present invention can be applied to a wide variety of surfaces, including both metallic and non-metallic surfaces of aircraft, which prevents icing, removes frozen water from the surface and prevents its reformation. The invention provides for a deicing composition that can be used on airplanes, runways, bridges, streets and the like. Further, the compositions can be used in heat transfer applications and in applications in which it is vital to maintain a liquid in the unfrozen state, e.g., as in a fire extinguisher. Additionally, the present invention provides for an anti-icing composition that can be applied to a surface, such as bridges, prior to the onset of icing conditions in order to prevent icing from occurring. Still further, the compositions of the present invention can be used as a deicer and/or anti-icer for pre-harvest fruit and vegetable crops.

DETAILED DESCRIPTION OF THE PRESENT INVENTION

The present invention provides novel compositions useful as deicing agents and/or anti-icing agents. The deicing agents of the present invention comprise certain hydroxyl-containing organic compounds, certain organic acid salts, alone or in admixture with each other.

It is also envisioned that the compositions of the invention can be prepared for use in either a liquid or a solid format.

For instance, the compound can be prepared as a liquid and sprayed or spread on surfaces. Alternatively it can be prepared in a solid form and employed as a powder. Optionally the solid may be further processed using methods well known in the art such as, for example, pelletizing, prilling, flaking, or macerating to provide the formulation in a final useable powdered or granular form. Any of the binders known to those skilled in the art may be optionally present and may either be inert or may be comprised of components that actively help lower the freezing point, for example, cinders, sawdust, sand, gravel, sugars, maltodextrins, and mixtures thereof can be used.

The amount of deicing or anti-icing agent of the present invention which is present in the total composition of the present invention can vary from about 5 to about 100 weight percent. Preferably the de-icing agent and/or anti-icing agent is present in an amount ranging from about 5 or 10 to about 90 weight percent, more preferably is present in an amount ranging from about 15 to about 80 weight percent, and most preferably is present in an amount ranging from about 30 to about 70 weight percent. In many preferred embodiments the deicing agents and/or anti-icing agents are used in about the same proportion as water, i.e., in a weight ratio of about 1:1 agent:water. In solid formulations, the deicing and/or anti-icing agents may comprise 100% of the final formulation.

The hydroxyl-containing organic compounds useful in certain embodiments of the present invention are generally selected from the group of hydrocarbyl aldosides; sorbitol and other hydrogenation products of sugars, monosaccharides, maltodextrins and sucrose; maltitol; glycols; monosaccharides; glycerol; and mixtures thereof.

The hydrocarbyl aldosides useful in the practice of the present invention are and known to those of ordinary skill in the art such as the di- and polysaccharides. An example of a hydrocarbyl aldoside useful in the practice of the present invention is the glucopyranoside sucrose (table sugar). Preferably, the hydrocarbyl aldosides comprise alkyl aldosides. Alkyl aldosides can be prepared, for example, as described in U.S. Pat. Nos. 4,223,129 and 4,329,449 which are incorporated herein by reference.

Typical of the alkyl aldosides useful in the practice of the present invention are alkyl glucosides, alkyl furanosides, alkyl maltosides, alkyl maltotriosides, alkylglucopyranosides, mixtures thereof and the like.

Other hydroxyl-containing compounds useful in the practice of the present invention are sorbitol and other hydrogenation products of sugars, monosaccharides, maltodextrins and sucrose such as maltitol, xylitol and mannitol; glycols such as ethylene glycol and propylene glycol; glycerols; and monosaccharides. These materials are available commercially and are well known to those of ordinary skill in the art.

The organic salt components useful in the practice of the present invention include the carboxylic acid salts, the hydroxycarboxylic acid salts, dicarboxylic acid salts.

The carboxylic acid salts which are useful in the practice of the present invention are likewise available commercially and are known to those skilled in the art. Carboxylic acid salts preferred for use in the practice of the present invention comprise the sodium or potassium salts of formates, acetates, propionates, butyrates and mixtures thereof. Also preferred are potassium acetate and/or potassium formate.

The hydroxycarboxylic acid salts which are useful in accordance with the present invention are available commercially and are known to those skilled in the art. Preferred hydroxycarboxylic acid salts comprise the salts of lactic acid such as sodium lactate and potassium lactate. However, any of the cesium, sodium, potassium, calcium and/or magnesium salts of hydroxycarboxylic acids may be employed such as sodium gluconate.

The dicarboxylic acid salts which are useful in accordance with the present invention are available commercially and are known to those skilled in the art. Preferred dicarboxylic acid salts comprise sodium and potassium salts of oxalates, malonates, succinates, glutarates, adipates, maleates, fumarates and mixtures of any of the foregoing.

Also useful as a deicing component in certain of the compositions of the present invention are the high solubility carbonic acid salts. Preferred carbonate salts for use in the practice of the present invention are potassium carbonate, potassium bicarbonate, sodium carbonate and cesium carbonate. Potassium carbonate is especially preferred. In many applications, the addition of carbonic acid salts such as potassium carbonate has been found to provide synergistically unexpected reductions in freezing points. For example, a 50/50 mixture of potassium acetate and water has a freezing point of −60° C., as seen in Table 1, Example 9. When this solution is mixed with the 50/50 sorbitol/water mixture from Table 1, Example 1, (freezing point −11° C.) the resulting solution as reported in Example 23 has a freezing point of −32° C., which is only 6° C. below the arithmetic average of the two base stocks. However, it was discovered that when combining the potassium carbonate solution from Example 7 (47% potassium carbonate in water, freezing point 20° C.) on a 1:1 basis with the 50/50 sorbitol/water mixture from Example 1, (freezing point −11° C.), the resulting compound as reported in Example 11 had the surprisingly low freezing point of 27° C., which is 15.5° C. lower than the arithmetic average.

In certain instances, where the pH of the carbonic acid or its salt is too high to meet regulatory or industry specifications, it is contemplated herein to use a buffering agent to lower the pH to acceptable levels. Suitable buffering agents may be selected from any of the known buffering agents. Especially preferred is boric acid. For example in highway applications, compositions including potassium carbonate and/or potassium bicarbonate in combination with a hydroxyl-containing component of the present invention or industrial process stream containing same, the pH in some formulations may be above 12, and most state highway departments prefer deicers having a pH below 12. An effective amount of boric acid or other buffering agent may be added to reduce the pH of the deicing compounds to less than 12, i.e., from about 11.5 to about 11.8 or lower, to meet the specifications. Alternatively, during the preparation of the carbonate the pH can be adjusted by continued reaction to bicarbonate or separate addition of same.

Thus, the instant invention provides an equally effective but considerably less expensive product than the prior art, as potassium carbonate of the present invention costs generally about 30% less than the commonly used potassium acetate of the prior art. Carbonic acid salts are available commercially and can be prepared by methods known to those of ordinary skill in the art.

Generally the organic freezing point lowering agents useful in the practice of the present invention may be used in solid form or mixed with water as pure components. However it is also contemplated that in certain cases they may be obtained in impure form such as from industrial process streams. For example, it is contemplated that the present invention may employ a number of industrial process streams which comprise a water soluble solution of carboxylic acid salts, hydroxycarboxylic acid salts and/or dicarboxylic acid salts. Although the purification of these materials is difficult due to their similarity in solubility characteristics to water, the dilute industrial process streams may be used directly in the practice of the present invention. The present invention contemplates, for non-limiting examples, the use of industrial process streams selected from the group consisting of a grain stillage, (grain steepwaters), a wood stillage, agricultural or milk fermentation processes, sugar extraction processes such a desugared sugar beet molasses and/or desugared sugar cane molasses, hydrogenation products of sugars, monosaccharides, maltodextrins and sucrose and mixtures of any of the foregoing. Generally, the components of the present invention are present in or may be readily derived by alcoholysis of the industrial process streams.

Certain of these industrial process streams may include components such as low molecular weight sugars such as, for example, sorbitols, sucroses, maltoses and glucoses. Where desired, by subjecting these waste streams to alcoholysis (with an alkyl alcohol) under conditions such as reacting with an alkyl alcohol in the presence of a cation exchange material or other acid, or the addition of an alkyl alcohol to a heated fermentation liquor at least some of the sugars will be converted to glucosides. For instance, ethanol treatment of a typical agricultural fermentation process stream comprising glucose would be at least partially converted to ethyl glucoside.

In addition to (a) the certain hydroxyl-containing organic compounds and (b) the certain organic acid salts, it is contemplated by the present invention that other organic components may be included in the deicing and/or anti-icing compositions of the present invention. Exemplary of such materials are citrate salts such as sodium citrate; amino acids and their salts such as lysine glutamate, sodium pyrrolidone carboxylate and sodium glucoheptonate; lignin components such as lignin sulfonate; boric acid and its salts; sodium gluconate and other gluconic acid salts; and mixtures of any of the foregoing.

In the methods of the present invention, the deicing and/or anti-icing compositions of the present invention are applied, such as by spraying for liquid forms, or spreading for solid forms, onto the surface desired to be treated. In the case of deicing, the surface already has ice formed thereon, and the deicing compositions of the present invention melt the ice already formed and are further effective in preventing additional ice formation. In the case of anti-icing, upon learning of a weather forecast which predicts possible dangerous icing conditions, the roads, bridges, airplanes, runways, growing produce or other surfaces can be pretreated with the anti-icing compositions of the present invention in similar manner in order to prevent ice formation on the treated surfaces.

In specific applications, certain embodiments of the present invention are especially preferred due to certain regulatory or industry guidelines. For example in the deicing and/or anti-icing of aircraft, it is preferred to use deicing and/or anti-icing agents of methyl glucoside; a mixture of sorbitol and glycerol; or a mixture of methyl glucoside, sorbitol and/or glycerol with sodium lactate and/or potassium lactate.

For the deicing and/or anti-icing of runways, it is preferred to use deicing and/or anti-icing agents of sodium lactate; potassium lactate; a mixture of sodium lactate and potassium lactate; a hydroxyl-containing organic compounds in combination with sodium lactate, potassium lactate and/or potassium acetate; a mixture of sodium lactate and/or potassium lactate with potassium acetate; or potassium carbonate.

For de-icing and/or anti-icing of pre-harvest fruit and vegetables such as fruit trees or grape vines, it is preferred to use de-icing and/or anti-icing agents of a hydroxyl-containing organic compound in combination with an organic acid salt, particularly a lactate salt.

The present invention also provides for the re-use of glycols recovered from airport collection systems for the de-icing and/or anti-icing of bridges, runways and highways. Currently, pure glycols are used to de-ice and/or anti-ice aircraft. The practice of collecting the glycol solutions that run off aircraft, either by using dedicated drainage systems or vacuum collection trucks, is increasing. However, the runway material cannot be collected efficiently and the salvaged material is very dilute. The present inventors have found that the used glycols can be recovered and reused as de-icing agents and/or anti-icing agents by upgrading these glycols and then re-applying the upgraded glycols. The upgrading of these glycols comprises the addition of a polyhydroxyl and/or organic acid salt to the recovered glycol. Also, where tolerable, the recovered glycols can be upgraded by the addition of inorganic salts, such as sodium chloride. The formulations of the present invention, such as sorbitol/glycerol or methyl glucoside can be recovered in the same way.

Generally, after application on the runway, the glycols are recovered in concentrations of about 10–20 weight percent. In accordance with the present invention, the addition of from about 5 to about 50 weight percent, preferably from about 30 to about 40 weight percent, based on the total weight of the composition, of the hydroxyl-containing organic compounds of the present invention, the organic acid salts of the present invention or combinations thereof provide for an effective upgraded glycol-recovered runoff, which can be reused for de-icing and/or anti-icing on bridges, for airport or aircraft deicing, and highways. Where inorganic salts can be tolerated, similar amounts of inorganic salts alone or in combination with the hydroxyl-containing organic compounds and/or organic acid salts may also be added.

In other situations where some inorganic salts can be tolerated, the present invention provides an improved method for reducing the amount of salt to be added to achieve an equivalent or better deicing and/or anti-icing effect, and thereby reduce the detriment to the environment. In these embodiments, the present invention provides for replacing a portion of the inorganic salt with the hydroxyl-containing organic compounds of the present invention, the organic acid salts of the present invention, or a combination thereof.

DESCRIPTION OF THE PREFERRED EMBODIMENTS

The testing results as reported in the examples below were obtained using the following procedures. Freezing points were determined by the ASTM D1177 method. A fluid sample was placed in a cold bath and cooled at a steady rate while monitoring the temperature of the sample and plotting temperature as a function of time. When ice crystals begin to form in a sample, the temperature remains constant until the entire sample freezes, creating an inflection point on the cooling curve indicative of the fluid freezing point. This test is useful in determining the useable temperature range of a deicing fluid and provides an indication as to the ice melting capability and dilution capacity of the fluid.

The Kinematic Viscosity of the fluid was determined by the ASTM D445 method and is defined as a fluid's resistance to flow. Viscosity is an important property of any fluid, and in the case of deicing fluid, viscosity is important in the aspects of fluid application and adherence. A fluid with a very high viscosity may be too thick to spray through application equipment, whereas a fluid with a very low viscosity may be too thin to adhere to the treated surface and run off. An optimum viscosity permits a fluid to be applied easily with conventional spray equipment and allows it to adhere to the surface for extended periods to prevent ice from forming on and bonding to the surface.

Conductivity is a measure of a fluid's ability or tendency to conduct an electric current. This property is an important factor in determining if a fluid is acceptable to be used near electrical wiring. Additionally, high conductivity can also lead to corrosion of metals as corrosion is an electrochemical reaction.

The pH of a fluid may affect its compatibility with various materials of construction it may contact (metals in particular). In order to minimize metal corrosion most deicing fluids are formulated to a pH that is neutral to slightly basic in order to keep the fluid within the passivation range of the metals commonly used in construction.

COD and BOD were measured by standard EPA methods. COD is defined as the amount of oxygen required to chemically oxidize an organic compound completely to carbon dioxide and water. It is expressed as grams $O_2$ per gram of compound. BOD is defined as the amount of oxygen consumed through the biodegradation of an organic compound by the action of microorganisms. The BOD/COD ratio often provides useful information as to the biodegradability and rate of biodegradation of an organic compound. Compounds which exhibit a high BOD or a high BOD/COD ratio, such as propylene glycol, can lead to rapid depletion of dissolved oxygen in water which can lead to fish kills in natural waterways. This is a potential hazard for deicing fluid run off into storm sewers and streams. Ideally, a deicing fluid should biodegrade completely but at a moderate rate that is less than that of propylene glycol.

The DOT corrosion test method used follows the NACE Standard TM-01-69 (1976 revision) as modified by Pacific Northwest Snowfighters consortium. This test is applicable to roadway deicing chemicals that are likely to contact carbon steel structural materials used in application equipment, automobiles, bridges, etc. It is intended to simulate accelerated conditions of repeated and prolonged exposures of steel substrates to dilute concentrations of deicing chemicals under cyclic wet-dry conditions. Deicing chemicals were evaluated for rate of corrosion of standard carbon steel substrates and compared with the rates obtained for distilled water and 3% sodium chloride solutions as controls.

The following examples are provided for illustrative purposes and are not to be construed to limit the scope of the claims in any manner whatsoever.

EXAMPLES 1–34

Deicing and/or anti-icing fluids were prepared from pure compounds in accordance with the present invention. They were then tested for freezing point, viscosity, conductivity, pH, COD, BOD and corrosion. MBS refers to desugared beet molasses from Michigan Beet Sugar. The results are reported below in Table 1.

| | EXAMPLE | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Composition | | | | | | | | | | | | | |
| Sorbitol | 50 | 0 | 0 | 0 | 0 | 0 | 0 | 0 | 0 | 0 | 25 | 0 | 0 |
| MeG | 0 | 50 | 0 | 0 | 0 | 0 | 0 | 0 | 0 | 0 | 0 | 25 | 0 |
| Glycerol | 0 | 0 | 50 | 0 | 0 | 0 | 0 | 0 | 0 | 0 | 0 | 0 | 25 |
| Propylene Glycol | 0 | 0 | 0 | 50 | 0 | 0 | 0 | 0 | 0 | 0 | 0 | 0 | 0 |
| MBS | 0 | 0 | 0 | 0 | 50 | 0 | 0 | 0 | 0 | 0 | 0 | 0 | 0 |
| Sucrose | 0 | 0 | 0 | 0 | 0 | 50 | 0 | 0 | 0 | 0 | 0 | 0 | 0 |
| Potassium Carbonate | 0 | 0 | 0 | 0 | 0 | 0 | 47 | 0 | 0 | 0 | 25 | 25 | 25 |
| Sodium Formate | 0 | 0 | 0 | 0 | 0 | 0 | 0 | 25 | 0 | 0 | 0 | 0 | 0 |
| Potassium Acetate | 0 | 0 | 0 | 0 | 0 | 0 | 0 | 0 | 50 | 0 | 0 | 0 | 0 |
| Sodium Lactate | 0 | 0 | 0 | 0 | 0 | 0 | 0 | 0 | 0 | 50 | 0 | 0 | 0 |
| Water | 50 | 50 | 50 | 50 | 50 | 50 | 53 | 75 | 50 | 50 | 50 | 50 | 50 |
| Properties | | | | | | | | | | | | | |
| Freezing Point, °C. | −11 | −16 | −23 | −33 | −16 | −7.5 | −20 | −19.5 | −60 | −32 | −27 | −33 | −37 |
| Viscosity, cSt | | | | | | | | | | | | | |
| 22° C. | 7.6 | 8.4 | 4.5 | 6.0 | 4.9 | 10.4 | 4.3 | 1.9 | 3.8 | 16.9 | 8.4 | 9.5 | 7.2 |
| −7° C. | 39.4 | 40.4 | 15.8 | 26.3 | 15.0 | 44.7 | 11.5 | 4.5 | 10.2 | 110.3 | 27.5 | 32.4 | 19.8 |
| Conductivity, mS/cm | 0.003 | 0.668 | 0.003 | 0.002 | 294 | <.001 | 880 | 354 | 654 | 401 | 466 | 486 | 470 |
| pH | 5.48 | 4.53 | 5.04 | 5.81 | 8.66 | 5.88 | >13 | 7.91 | 9.87 | 7.19 | 12.63 | 12.73 | 12.72 |
| COD kg/kg | 0.60 | 0.63 | 0.68 | 0.82 | 0.32 | 0.53 | 0.04 | 0.04 | 0.34 | 0.47 | 0.21 | 0.26 | 0.26 |
| BOD kg/kg | 0.34 | 0.34 | 0.33 | 0.53 | 0.13 | 0.24 | <0.005 | 0.33 | 0.18 | 0.24 | 0.16 | 0.10 | 0.18 |
| PNSDOT Corrosion | −3.1 | −0.8 | −3.5 | −2.2 | 14.9 | −2.58 | 0.3 | 68.2 | −2.5 | −1.8 | −1.1 | −0.5 | −5.5 |

| | EXAMPLE | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Composition | | | | | | | | | | | | | |
| Sorbitol | 0 | 0 | 0 | 25 | 0 | 0 | 0 | 0 | 0 | 25 | 0 | 0 | 0 |

-continued

| | | | | | | | | | | | | | |
|---|---|---|---|---|---|---|---|---|---|---|---|---|---|
| MeG | 0 | 0 | 0 | 0 | 25 | 0 | 0 | 0 | 0 | 0 | 25 | 0 | 0 |
| Glycerol | 0 | 0 | 0 | 0 | 0 | 25 | 0 | 0 | 0 | 0 | 0 | 25 | 0 |
| Propylene Glycol | 25 | 0 | 0 | 0 | 0 | 0 | 25 | 0 | 0 | 0 | 0 | 0 | 25 |
| MBS | 0 | 25 | 0 | 0 | 0 | 0 | 0 | 25 | 0 | 0 | 0 | 0 | 0 |
| Sucrose | 0 | 0 | 25 | 0 | 0 | 0 | 0 | 0 | 25 | 0 | 0 | 0 | 0 |
| Potassium Carbonate | 25 | 25 | 25 | 0 | 0 | 0 | 0 | 0 | 0 | 0 | 0 | 0 | 0 |
| Sodium Formate | 0 | 0 | 0 | 25 | 25 | 25 | 25 | 25 | 25 | 0 | 0 | 0 | 0 |
| Potassium Acetate | 0 | 0 | 0 | 0 | 0 | 50 | 0 | 0 | 0 | 25 | 25 | 25 | 25 |
| Sodium Lactate | 0 | 0 | 0 | 0 | 0 | 0 | 50 | 0 | 0 | 0 | 0 | 0 | 0 |
| Water | 50 | 50 | 50 | 53 | 75 | 50 | 50 | 50 | 50 | 50 | 50 | 50 | 50 |
| Properties | | | | | | | | | | | | | |
| Freezing Point, °C. | −52* | −36 | −26 | −22 | −23 | −34 | −15 | −21 | −24 | −32 | −34 | −41 | −51.3 |
| Viscosity, cSt | | | | | | | | | | | | | |
| 22° C. | 6.7 | 6.5 | 10.3 | 9.2 | 9.2 | 6.4 | 6.9 | 6.3 | 9.6 | 5.7 | 6.3 | 4.4 | 4.7 |
| −7° C. | 22.1 | 16.1 | 33.9 | 32.9 | 71.9 | 23.5 | 27.3 | 22.0 | 38.4 | 18.3 | 21.2 | 13.6 | 16.1 |
| Conductivity, mS/cm | 476 | 532 | 444 | 424 | 377 | 414 | 391 | 471 | 426 | 300 | 322 | 287 | 274 |
| pH | 13.21 | 12.13 | 12.32 | 7.71 | 7.63 | 7.62 | 8.11 | 8.21 | 7.76 | 8.87 | 8.90 | 8.88 | 9.33 |
| COD kg/kg | 0.35 | 0.08 | 0.22 | 0.28 | 0.37 | 0.31 | 0.42 | 0.18 | 0.31 | 0.43 | 0.47 | 0.44 | 0.59 |
| BOD kg/kg | 0.19 | 0.08 | 0.14 | 0.20 | 0.15 | 0.16 | 0.24 | 0.13 | 0.24 | 0.24 | 0.14 | 0.32 | 0.35 |
| PNSDOT Corrosion | −6.4 | −1.2 | −6.6 | 13.8 | 77.4 | 28.0 | 43.5 | 18.0 | 41.5 | −2.5 | −2.6 | −2.5 | −2.6 |

| | | EXAMPLE | | | | | | |
|---|---|---|---|---|---|---|---|---|
| | | 27 | 28 | 29 | 30 | 31 | 32 | 33 | 34 |
| Composition | | | | | | | | | |
| Sorbitol | | 0 | 0 | 25 | 0 | 0 | 0 | 0 | 0 |
| MeG | | 0 | 0 | 0 | 25 | 0 | 0 | 0 | 0 |
| Glycerol | | 0 | 0 | 0 | 0 | 25 | 0 | 0 | 0 |
| Propylene Glycol | | 0 | 0 | 0 | 0 | 0 | 25 | 0 | 0 |
| MBS | | 25 | 0 | 0 | 0 | 0 | 0 | 25 | 0 |
| Sucrose | | 0 | 25 | 0 | 0 | 0 | 0 | 0 | 25 |
| Potassium Carbonate | | 0 | 0 | 0 | 0 | 0 | 0 | 0 | 0 |
| Sodium Formate | | 0 | 0 | 0 | 0 | 0 | 0 | 0 | 0 |
| Potassium Acetate | | 25 | 25 | 0 | 0 | 0 | 0 | 0 | 0 |
| Sodium Lactate | | 0 | 0 | 25 | 25 | 25 | 25 | 25 | 25 |
| Water | | 53 | 75 | 50 | 50 | 50 | 50 | 50 | 50 |
| Properties | | | | | | | | | |
| Freezing Point, °C. | | −40 | −31 | −27 | −29 | −39 | −44.3* | −29 | −27 |
| Viscosity, cSt | | | | | | | | | |
| 22° C. | | 4.3 | 6.4 | 10.9 | 10.9 | 8.2 | 8.1 | 8.3 | 13.4 |
| −7° C. | | 12.9 | 21.7 | 59.2 | 60.1 | 36.3 | 40.3 | 36.1 | 71.6 |
| Conductivity mS/cm | | 355 | 292 | 199 | 202 | 200 | 181 | 276 | 189 |
| pH | | 8.83 | 8.87 | 7.61 | 7.60 | 7.51 | 7.90 | 8.32 | 7.55 |
| COD kg/kg | | 0.33 | 0.42 | 0.49 | 0.53 | 0.54 | 0.61 | 0.37 | 0.48 |
| BOD kg/kg | | 0.20 | 0.29 | 0.34 | 0.33 | 0.36 | 0.40 | 0.25 | 0.25 |
| PNSDOT Corrosion | | −2.6 | −2.4 | −1.3 | −1.5 | −1.2 | −0.7 | −0.8 | −0.3 |

EXAMPLES 35–38

Deicing and/or anti-icing compositions prepared in accordance with the present invention employing industrial process streams as at least part of the deicing and/or anti-icing composition were tested for freezing points. The results are set forth in Table 2.

TABLE 2

| Example | 35 | 36 | 37 | 38 |
|---|---|---|---|---|
| Composition | | | | |
| CSB | 25 | 0 | 25 | 0 |
| Potassium Carbonate | 25 | 25 | 0 | 0 |
| CMS | 0 | 25 | 0 | 25 |
| Potassium acetate | 0 | 0 | 25 | 25 |
| Water | 50 | 50 | 50 | 50 |
| Properties | | | | |
| Freezing Point, °C. | −44 | −38 | −48 | −42 |

CSB refers to Molasses Concentrated Separator Bottoms from Idaho Beet Sugar (Amalgamated Sugar) having the following approximate composition:

| COMPONENT GROUPS | % by Weight | % on Dry Substance |
|---|---|---|
| Dissolved Solids (RDS) | 74.84 | — |
| Ash | 22.81 | 30.47 |
| Crude Protein | 19.44 | 25.97 |
| Nitrogen Compounds (As N) | 3.11 | 4.16 |
| α-Amino Nitrogen Compounds (As N) | 0.41 | 0.55 |
| INDIVIDUAL COMPOUNDS | | |
| Sucrose | 13.13 | 17.54 |
| Raffinose | 3.96 | 5.29 |
| Invert | 0.020 | 0.027 |
| Betaine | 8.95 | 11.82 |
| Potassium | 8.85 | 11.82 |
| Sodium | 1.98 | 2.65 |
| Calcium | 0.04 | 0.05 |
| Chloride | 1.83 | 2.44 |
| Nitrate | 0.70 | 0.94 |
| Sulfate | 2.1 | 2.8 |

-continued

| COMPONENT GROUPS | % by Weight | % on Dry Substance |
|---|---|---|
| Pyrrolidone Carboxylic Acid (PCA) | 6.29 | 8.40 |
| Tyrosine | 0.28 | 0.38 |
| Serine | 0.05 | 0.07 |
| Isoleucine and/or Proline | 0.47 | 0.63 |
| Glutamic Acid | 0.88 | 1.18 |
| Aspartic Acid | 0.89 | 1.19 |
| Threonine | 0.015 | 0.02 |
| Alanine | 0.16 | 0.21 |
| Valine | 0.12 | 0.16 |
| Glycine | 0.06 | 0.08 |

CMS refers to Concentrated Molasses Solids from Michigan Beet Sugar (Monitor Sugar) having the following approximate composition (DS=dry solids):

| | STANDARDS |
|---|---|
| Total Solids (Brix) | 70.0% approx. |
| Sucrose | 26.5% on DS approx. |
| Raffinose | 5.0% on DS approx. |
| Nitrogen Compound (as N) | 3.5% on DS approx. |
| Crude Protein | 22.0% on DS approx. |
| Betaine | 8.5% on DS approx. |
| Amino Acids | 0.5% on DS approx. |
| Ash | 30.0% on DS approx. |
| Bulk Density | 11.2 lbs./gallon approx. |
| Others | 4.0% on DS approx. |

EXAMPLE 39

A mixture of 25% by weight water, 65% by weight ethyl lactate and 10% by weight sodium lactate was prepared. No crystal formation was observed at a temperature of −50° C.

EXAMPLE 40

A mixture of 50% by weight water and 50% by weight ethyl lactate was prepared. The mixture had a melting point of −18° C.

EXAMPLE 41

A mixture of 70% by weight water, 24% by weight ethyl lactate and 6% by weight sodium lactate was prepared. The mixture had a melting point of −25° C. as determined by DSC and a pH of 6.0. For comparison, a 70% by weight water/30% by weight ethylene glycol solution has a melting point of −18° C.

EXAMPLE 42

The addition of 50% by weight of a 50% mixture of ethyl lactate in water to a concentrated, filtered corn steep liquor (containing 50% water and 50% solids comprising mostly lactic acid and sugars) caused a reduction in freezing point from −11° C. to −16° C. The addition of 2% by weight sodium lactate further reduced the freezing point to −20° C.

EXAMPLE 43

A mixture of 60% by weight water, 20% by weight sodium lactate, 2% by weight proline (an amino acid), 8% by weight sorbitol and 10% by weight sodium pyrrolidone carboxylate (sodium PCA) was prepared. No crystal formation at −35° C. was observed. The pH was 6.57. For comparison a 50% by weight solution propylene glycol has a freezing point of −36° C.

EXAMPLE 44

A mixture of 12% by weight methyl lactate, 44% by weight methyl glucoside and 44% by weight water was prepared. A melting point of −18° C. was observed. The mixture had a pH of 5.

EXAMPLE 45

A mixture containing 35% by weight methyl lactate, 35% by weight methyl glucoside and 30% by weight water has a melting point of −21° C. as determined by DSC.

EXAMPLE 46

A filtered concentrated liquid residue of a 50% mixture of corn stillage and steepwater containing 50% by weight water with a freezing point of −12° C. is heated to 90° C. and treated with 5% ethanol for 8 hours. The resulting mixture has a freezing point of −17° C. The addition of 2% sodium lactate further reduces the freezing point to −21° C.

EXAMPLES 47–53

Additional deicing and anti-icing fluids containing potassium carbonate were prepared in accordance with the present invention. The results are set forth below in Table 3.

TABLE 3

| Example | 47 | 48 | 49 | 50 | 51 | 52 | 53 |
|---|---|---|---|---|---|---|---|
| Composition | | | | | | | |
| Methyl Glucoside | 10 | 10 | 0 | 0 | 0 | 15 | 0 |
| Sodium Lactate | 10 | 0 | 0 | 0 | 10 | 0 | 0 |
| Potassium Lactate | 0 | 10 | 0 | 0 | 0 | 15 | 0 |
| Sorbitol | 0 | 0 | 0 | 0 | 10 | 0 | 0 |
| Glycerol | 0 | 0 | 0 | 33 | 0 | 0 | 0 |
| Propylene Glycol | 0 | 0 | 30 | 0 | 0 | 0 | 25 |
| Potassium Carbonate | 40 | 40 | 30 | 33 | 40 | 30 | 35 |
| Water | 40 | 40 | 40 | 34 | 40 | 40 | 40 |
| Properties | | | | | | | |
| Freezing Point, ° C. | −16 | −16 | −16 | −16 | −14 | −15 | −18 |

EXAMPLES 54–61

Additional deicing and anti-icing fluids containing potassium carbonate were prepared in accordance with the present invention and measured for BOD and COD values. The results are set forth below in Table 4. For comparative purposes, the COD and BOD for a 50/50 glycol/water mixture are also provided. Also, for reference the COD and BOD, respectively, for the individual components are as follows: methyl glucoside (1.24, 0.71), sodium lactate (0.86, 0.51), potassium lactate (0.75, 0.45), sorbitol (1.14, 0.70), propylene glycol (1.68, 1.14) potassium carbonate (0.00, 0.00), water (0.00, 0.00).

TABLE 4

| Composition | 54 | 55 | 56 | 57 | 58 | 59 | 60 | 61 |
|---|---|---|---|---|---|---|---|---|
| Methyl Glucoside | 10 | 10 | 0 | 0 | 0 | 15 | 0 | 0 |
| Sodium Lactate | 10 | 0 | 0 | 0 | 10 | 0 | 0 | 0 |
| Potassium Lactate | 0 | 10 | 0 | 0 | 0 | 15 | 0 | 0 |
| Sorbitol | 0 | 0 | 0 | 0 | 10 | 0 | 0 | 0 |
| Glycerol | 0 | 0 | 0 | 33 | 0 | 0 | 0 | 0 |
| Propylene Glycol | 0 | 0 | 30 | 0 | 0 | 0 | 25 | 50 |
| Potassium Carbonate | 40 | 40 | 30 | 33 | 40 | 30 | 35 | 0 |
| Water | 40 | 40 | 40 | 34 | 40 | 40 | 40 | 50 |
| Properties | | | | | | | | |
| COD kg/kg | 0.21 | 0.20 | 0.50 | 0.40 | 0.20 | 0.30 | 0.42 | 0.84 |
| BOD kg/kg | 0.12 | 0.12 | 0.34 | 0.24 | 0.12 | 0.17 | 0.29 | 0.57 |

From the above data it can be seen that excellent deicing and/or anti-icing materials can be obtained in accordance with the present invention.

Many variations of the present invention will suggest themselves to those skilled in the art in light of the above-detailed description. For example, any industrial process stream which contains carboxylic acid salts, hydroxycarboxylic acid salts and/or dicarboxylic acid salts may be used to prepare the compositions of the present invention. Additionally, a wide variety of glucosides, carbonates, hydrocarbyl aldosides, and a variety of combinations of the components of the present invention may be employed in the compositions of the present invention. All such obvious modifications are within the full intended scope of the appended claims.

The above-referenced patents, test methods, and publications are hereby incorporated by reference.

What is claimed is:

1. A deicing and/or anti-icing composition comprising (a) an effective freezing point lowering amount of glycerol; (b) an effective freezing point lowering amount of an acid salt comprising a carbonic acid potassium salt; and, optionally, (c) water.

2. A composition as defined in claim 1 wherein said carbonic acid potassium salt comprises potassium carbonate, potassium bicarbonate or a mixture thereof.

3. A deicing and/or anti-icing composition comprising (a) an effective freezing point lowering amount of a monosaccharide; (b) an effective freezing point lowering amount of an acid salt selected from the group consisting of a carboxylic acid salt, a hydroxycarboxylic acid salt, a dicarboxylic acid salt and mixtures thereof; and, optionally (c) water.

4. A composition as defined in claim 3 wherein said acid salt comprises a carbonic acid salt.

5. A composition as defined in claim 4 wherein said carbonic acid salt comprises potassium carbonate, sodium carbonate or a mixture thereof.

6. A composition as defined in claim 3 wherein said carboxylic acid salt comprises potassium acetate.

7. A method of deicing or anti-icing a surface, said method comprising adding to a surface a deicing or anti-icing agent comprising (a) an effective freezing point lowering amount of glycerol; (b) an effective freezing point lowering amount of an acid salt comprising a carbonic acid potassium salt; and, optionally, (c) water.

8. A method as defined in claim 7 wherein said carbonic acid potassium salt comprises potassium carbonate.

9. A method of deicing or anti-icing a surface, said method comprising adding to a surface a deicing or anti-icing agent comprising (a) an effective freezing point lowering amount of glycerol obtained from an airport or aircraft runoff; (b) an effective freezing point lowering amount of an acid salt selected from the group consisting of a carboxylic acid potassium salt, a hydroxycarboxylic acid potassium salt, a dicarboxylic acid potassium salt, a carbonic acid potassium salt and mixtures thereof; and, optionally, (c) water.

10. A method as defined in claim 9 wherein said carboxylic acid potassium salt comprises potassium acetate.

11. A method of deicing or anti-icing a surface, said method comprising adding to a surface a deicing or anti-icing agent comprising (a) an effective freezing point lowering amount of a glycol obtained from an airport or aircraft runoff; (b) an effective freezing point lowering amount of an acid salt selected from the group consisting of a $C_1$–$C_4$ carboxylic acid salt, a $C_1$–$C_4$ hydroxycarboxylic acid salt, a $C_1$–$C_4$ dicarboxylic acid salt, a carbonic acid salt and mixtures thereof; and, optionally, (c) water.

12. A method as defined in claim 11 wherein said acid salt comprises a carbonic acid salt.

13. A method as defined in claim 12 wherein said carbonic acid salt comprises potassium carbonate, sodium carbonate or a mixture thereof.

14. A method as defined in claim 11 wherein said glycol is obtained from an airport or aircraft runoff.

15. A method as defined in claim 11 wherein said $C_1$–$C_4$ carboxylic acid salt comprises potassium acetate.

16. A method of deicing or anti-icing a surface comprising, said method comprising adding to a surface a deicing or anti-icing agent comprising (a) an effective freezing point lowering amount of a monosaccharide; (b) an effective freezing point lowering amount of an acid salt selected from the group consisting of a carboxylic acid salt, a hydroxycarboxylic acid salt, a dicarboxylic acid salt, carbonic acid salt and mixtures thereof; and, optionally (c) water.

17. A method as defined in claim 16 wherein said acid salt comprises a carbonic acid salt.

18. A method as defined in claim 17 wherein said carbonic acid salt comprises potassium carbonate, sodium carbonate or a mixture thereof.

19. A method as defined in claim 16 wherein said monosaccharide is obtained from an airport or aircraft runoff.

20. A method as defined in claim 16 wherein said carboxylic acid salt comprises potassium acetate.

21. A deicing and/or anti-icing composition comprising (a) an effective freezing point amount of a hydroxyl-containing compound obtained from an airport run-off, and (b) an effective freezing point lowering amount of an acid salt selected from the group consisting of a carboxylic acid salt, a hydroxycarboxylic acid salt, a dicarboxylic acid salt, a carbonic acid salt and mixtures thereof; and optionally (c) water.

22. A composition as defined in claim 21 wherein said hydroxyl-containing compound obtained from an airport run-off is selected from the group consisting of glycols, monosaccharides, hydrocarbyl aldosides, alcohols, glycerols and mixtures thereof.

23. A composition as defined in claim 22 wherein said glycol comprises propylene glycol.

24. A composition as defined in claim 22 wherein said hydrocarbyl aldoside comprises a hydrogenation product of a sugar, monosaccharide or sucrose.

25. A composition as defined in claim 23 wherein said hydrogenation product of a sugar comprises sorbitol, maltitol and mixtures thereof.

26. A composition as defined in claim 22 wherein said hydrocarbyl aldoside comprises sucrose.

27. A composition as defined in claim 22 wherein said hydrocarbyl aldoside comprises a disaccharide, a polysaccharide or a mixture thereof.

28. A composition as defined in claim 22 wherein said acid salt is selected from the group consisting of potassium acetate, potassium carbonate, calcium magnesium acetates, sodium lactate, potassium lactate and mixtures thereof.

29. A composition as defined in claim 22 further comprising material from an industrial process stream selected from the group consisting of grain stillage, grain steepwater, wood stillage, agricultural fermentation processes, milk fermentation processes, sugar extraction processes and mixtures thereof.

30. A composition as defined in claim 22 wherein said sugar extraction process comprises desugared beet molasses, desugared cane molasses and mixtures thereof.

31. A composition as defined in claim 22 further comprising an effective freezing point lowering amount of urea.

32. A composition as defined in claim 22 further comprising an effective freezing point lowering amount of additional hydroxyl-containing compound.

33. A composition as defined in claim 32 wherein said additional hydroxyl-containing compound is selected from the group consisting of glycols, monosaccharides, hydrocarbyl aldosides, glycerol and mixtures thereof.

34. A method of deicing and/or anti-icing a surface, said method comprising adding to said surface a deicing and/or anti-icing agent as defined in claim 22.

35. A method of deicing and/or anti-icing a surface, said method comprising adding to aid surface a deicing and/or anti-icing agent as defined in claim 23.

36. A method of deicing and/or anti-icing a surface, said method comprising adding to said surface a deicing and/or anti-icing agent as defined in claim 24.

37. A method of deicing and/or anti-icing a surface, said method comprising adding to said surface a deicing and/or anti-icing agent as defined in claim 25.

38. A method of deicing and/or anti-icing a surface, said method comprising adding to said surface a deicing and/or anti-icing agent as defined in claim 26.

39. A method of deicing and/or anti-icing a surface, said method comprising adding to said surface a deicing and/or anti-icing agent as defined in claim 27.

40. A method of deicing and/or anti-icing a surface, said method comprising adding to said surface a deicing and/or anti-icing agent as defined in claim 28.

41. A method of deicing and/or anti-icing a surface, said method comprising adding to said surface a deicing and/or anti-icing agent as defined in claim 29.

42. A method of deicing and/or anti-icing a surface, said method comprising adding to said surface a deicing and/or anti-icing agent as defined in claim 30.

43. A method of deicing and/or anti-icing a surface, said method comprising adding to said surface a deicing and/or anti-icing agent as defined in claim 31.

44. A method of deicing and/or anti-icing a surface, said method comprising adding to said surface a deicing and/or anti-icing agent as defined in claim 32.

45. A method of deicing and/or anti-icing a surface, said method comprising adding to said surface a deicing and/or anti-icing agent as defined in claim 33.

46. A deicing and/or anti-icing composition comprising (a) an effective freezing point lowering amount of a hydroxyl-containing organic compound selected from the group consisting of disaccharides, polysaccharides, monosaccharides and mixtures thereof; (b) a carbonic acid salt; and, optionally, (c) water.

47. A composition as defined in claim 46 wherein said carbonic acid salt comprises potassium carbonate, potassium bicarbonate and mixtures thereof.

48. A method of deicing and/or anti-icing a surface, said method comprising adding to said surface a deicing and/or anti-icing agent comprising (a) an effective freezing point lowering amount of a hydroxyl-containing organic compound selected from the group consisting of disaccharides, polysaccharides, monosaccharides and mixtures thereof; (b) an acid salt selected from the group consisting of a carbonic acid salt and mixtures thereof; and, optionally, (c) water.

49. A method as defined in claim 48 wherein said carbonic acid salt comprises potassium carbonate, potassium bicarbonate, sodium carbonate, sodium bicarbonate and mixtures thereof.

50. An improved process for providing a deicing and/or anti-icing agent comprising an inorganic halide salt, the improvement comprising reducing the amount of inorganic halide salt by replacing at least 5 weight percent of said inorganic halide salt with (a) an effective freezing point lowering amount of a hydroxyl-containing organic compound selected from the group consisting of furanosides, maltosides, maltotriosides, glucopyranosides, glycerol, glycols, monosaccharides, hydrogenation products of sugars, hydrogenation products of monosaccharides, maltodextrins and mixtures thereof, or (b) an effective freezing point lowering amount of an organic acid salt selected from the group consisting of carboxylic acid salts, hydroxycarboxylic acid salts, dicarboxylic acid salts and mixtures thereof, or (c) a mixture of (a) and (b).

51. An improved process as defined in claim 50 wherein said hydroxyl-containing compound is obtained from an airport or aircraft runoff comprising a monosaccharide, a hydrocarbyl aldoside, glycerol, a glycol, a hydrogenation products of a sugar, alcohol and mixtures thereof.

52. An improved process as defined in claim 50 wherein said inorganic halide salt comprises sodium chloride, calcium chloride, magnesium chloride or a mixture thereof.

53. A method for deicing and/or anti-icing pre-harvest fruit and vegetable crops comprising spraying on said crops (a) an effective freezing point lowering amount of an organic compound selected from the group consisting of non-alkyl glucosides, furanosides, maltosides, maltotriosides, glucopyranosides, glycerol, glycols, monosaccharides, sorbitol, hydrogenation products of sugar, hydrogenation products of monosaccharides, hydrogenation products of maltodextrins, hydrogenation products of sucrose, maltitol and mixtures thereof; or (b) an effective freezing point lowering amount of an acid salt selected from the group consisting of carboxylic acid salts, hydroxycarboxylic acid salts, dicarboxylic acid salts and mixtures thereof; or (c) a mixture of (a) and (b).

54. A method as defined in claim 53 wherein said acid salt comprises a salt of lactic acid.

55. A process for preparing an agent for addition to soluble salts to produce a deicing and/or anti-icing formulation comprising (a) recovering an aircraft or airport runoff comprising a freezing point lowering compound; and (b) adding said recovered aircraft or airport runoff to said soluble salt.

56. A process as defined in claim 55 wherein said freezing point lowering compound comprises a hydroxyl-containing compound.

57. A process as defined in claim 56 wherein said hydroxyl-containing compound is selected from the group consisting of glycols, monosaccharides, hydrocarbyl aldosides, glycerols, alcohols and mixtures thereof.

58. A process as defined in claim 57 wherein said glycols are selected from the group consisting of ethylene glycol, propylene glycol, diethylene glycol and mixtures thereof.

59. A process as defined in claim 57 wherein said hydrocarbyl aldosides are selected from the group consisting of a hydrogenation product of a sugar, sucrose and mixtures thereof.

60. A process as defined in claim 59 wherein said hydrogenation product of a sugar comprises sorbitol, maltitol and mixtures thereof.

61. A process as defined in claim 55 further comprising upgrading said recovered aircraft or airport runoff prior to adding said runoff to said soluble salt.

62. A process as defined in claim 56 wherein said upgrading comprises adding to said aircraft or airport runoff an effective freezing point lowering amount of a hydroxyl-containing compound.

63. A process as defined in claim 62 wherein said hydroxyl-containing compound is selected from the group consisting of glycols, monosaccharides, hydrocarbyl aldosides, glycerols, alcohols and mixtures thereof.

64. A process as defined in claim 63 wherein said glycol comprises ethylene glycol, propylene glycol, diethylene glycol and mixtures thereof.

65. A process as defined in claim 63 wherein said hydrocarbyl aldoside comprises a disaccharide, a polysaccharide, or mixtures thereof.

66. A process as defined in claim 63 wherein said hydrocarbyl aldoside comprises an alkyl aldoside selected from the group consisting of glucosides, furanosides, maltotriosides, glucopyranosides and mixtures thereof.

67. A process as defined in claim 66 wherein said alkyl aldoside comprises methyl glucoside.

68. A process as defined in claim 63 wherein said hydrocarbyl aldoside comprises a hydrogenation product of a sugar, a monosaccharide, a maltodextrins or sucrose.

69. A process as defined in claim 68 wherein said hydrogenation product comprises sorbitol, maltitol or mixtures thereof.

70. A deicing and/or anti-icing composition comprising (a) an effective freezing point lowering amount of a freezing point lowering compound obtained from aircraft or airport runoff and (b) an effective freezing point lowering amount of an acid salt selected from the group consisting of a carboxylic acid salt, a hydroxycarboxylic acid salt, a dicarboxylic acid salt, a carbonic acid salt and mixtures thereof.

71. A composition as defined in claim 70 wherein said acid salt comprises a carbonic acid salt.

72. A composition as defined in claim 71 wherein said carbonic acid salt comprises potassium carbonate, potassium bicarbonate, sodium carbonate, sodium bicarbonate and mixtures thereof.

73. A composition as defined in claim 70 wherein said acid salt comprises a carboxylic acid salt.

74. A composition as defined in claim 73 wherein said carboxylic acid salt comprises potassium acetate.

75. A deicing and/or anti-icing composition comprising (a) an effective freezing point lowering amount of a freezing point lowering compound obtained from aircraft or airport runoff and (b) an effective freezing point lowering amount of an inorganic salt.

76. A composition as defined in claim 75 wherein said inorganic salt is selected from the group consisting of sodium chloride, magnesium chloride, calcium chloride and mixtures thereof.

77. A method of deicing and/or anti-icing a surface, said method comprising applying to said surface an effective freezing point lowering amount of an agent produced by a process comprising (a) recovering an aircraft or airport runoff comprising a freezing point lowering compound; and (b) adding said recovered aircraft or airport runoff to said soluble salt.

78. A method as defined in claim 77 wherein said surface comprises a pedestrian walkway, a vehicular roadway, a parking facility, an industrial facility, or an airport runway.

79. A method of deicing and/or anti-icing a surface, said method comprising applying to said surface an effective freezing point lowering amount of a deicing and/or anti-icing composition comprising (a) an effective freezing point lowering amount of a freezing point lowering compound obtained from aircraft or airport runoff and (b) an effective freezing point lowering amount of an acid salt selected from the group consisting of a carboxylic acid salt, a hydroxycarboxylic acid salt, a dicarboxylic acid salt, a carbonic acid salt and mixtures thereof.

80. A method as defined in claim 79 wherein said surface comprises a pedestrian walkway, a vehicular roadway, a parking facility, an industrial facility, or an airport runway.

81. A method of deicing and/or anti-icing a surface, said method comprising applying to said surface a deicing and/or anti-icing composition comprising (a) an effective freezing point lowering amount of a freezing point lowering compound obtained from aircraft or airport runoff and (b) an effective freezing point lowering amount of an inorganic salt.

82. A method as defined in claim 81 wherein said surface comprises a pedestrian walkway, a vehicular roadway, a parking facility, an industrial facility, or an airport runway.

\* \* \* \* \*

UNITED STATES PATENT AND TRADEMARK OFFICE
CERTIFICATE OF CORRECTION

PATENT NO. : 6,506,318 B1
DATED : January 14, 2003
INVENTOR(S) : Richard Sapienza et al.

It is certified that error appears in the above-identified patent and that said Letters Patent is hereby corrected as shown below:

Column 16,
Line 49, rewrite "comprises" to read -- is selected from the group consisting of --.

Column 17,
Line 1, rewrite "claim 23" to read -- claim 24 --.
Line 20, rewrite "and" to read -- or --.

Column 18,
Line 37, rewrite "comprising" to read -- is selected from the group consisting of --.

Column 19,
Line 18, rewrite "claim 56" to read -- claim 61 --.
Line 27, rewrite "comprises" to read -- is selected from the group consisting of --.

Column 20,
Line 23, rewrite "said" to read -- a -- (second occurrence).

Signed and Sealed this

First Day of July, 2003

JAMES E. ROGAN
*Director of the United States Patent and Trademark Office*